United States Patent [19]

Richter et al.

[11] Patent Number: 4,943,757
[45] Date of Patent: Jul. 24, 1990

[54] SAFETY APPARATUS FOR A MOTOR DRIVEN WINDOW

[75] Inventors: Siegfried Richter, Eckental-Eckenhaid; Friedrich Schauer, Heroldsberg; Peter Bauernfeind, Nuremberg, all of Fed. Rep. of Germany

[73] Assignee: Kabelmetal Electro GmbH, Hanover, Fed. Rep. of Germany

[21] Appl. No.: 355,471

[22] Filed: May 23, 1989

[30] Foreign Application Priority Data

May 31, 1988 [DE] Fed. Rep. of Germany ....... 3818456

[51] Int. Cl.$^5$ .......................... E05F 15/08; H02P 1/22
[52] U.S. Cl. .................................... 318/468; 318/256; 318/286; 49/28
[58] Field of Search .............. 318/256, 264, 265, 266, 318/280, 283, 285, 286, 466, 468; 49/28

[56] References Cited

U.S. PATENT DOCUMENTS

| | | | |
|---|---|---|---|
| 3,465,476 | 9/1969 | Rayner et al. | 200/61.71 X |
| 3,689,814 | 9/1972 | Holt | 318/466 X |
| 4,351,016 | 9/1982 | Felbinger | 318/286 X |
| 4,490,639 | 12/1984 | Echols et al. | 310/319 |
| 4,580,074 | 4/1986 | Gilman | 310/319 X |
| 4,621,223 | 11/1986 | Murakami et al. | 318/286 X |
| 4,631,461 | 12/1986 | Peugeot | 318/286 X |

Primary Examiner—Bentsu Ro
Attorney, Agent, or Firm—James C. Jangarathis

[57] ABSTRACT

There is disclosed a safety apparatus for a motor driven window that comprises an elongated sensing mechanism that extends substantially across the width of a window aperture and along that side of the window aperture toward which a closing, motor driven window moves. Such elongated sensing mechanism is comprised, at least in part, of a piezoelectric cable for generating electrical pulses upon an obstruction extending across the path of the closing window being pushed against the sensing mechanism by the closing window. Coupled to the motor driven window is an electric motor that is connected so as to be responsive to the electrical pulses generated by the piezoelectric cable for automatically reversing the direction of rotation of the electric motor.

2 Claims, 1 Drawing Sheet

SAFETY APPARATUS FOR A MOTOR DRIVEN WINDOW

The invention relates to a safety apparatus for a motor driven window, and in particular for such a window in a automotive vehicle for automatically reversing the direction of rotation of an electric motor that drives the window upon the window engaging an obstruction.

BACKGROUND OF THE INVENTION

Many automotive vehicles, and particularly the expensive models, are equipped with electrical window systems. Generally, such systems enable electrical, push button control of electric motors that open and close such windows. Inherent to such systems is the danger that an obstruction may at times be present across the path of a motor driven, closing window, and may be tightly clamped or squeezed with excessive force unintentionally applied from the electric motor. Such an obstruction may be a human hand or neck, or a neck of a pet animal, and the force applied may at times be injurious to the extreme. The inattentive control of such electrical window systems, the control of such systems by children, and the occasional defective operation of such systems all add to the dangers presented thereby.

OBJECT OF THE INVENTION

The object of the present invention is to provide a safety apparatus for a motor driven window which automatically prevents the window moving in a closing direction from being clamped or squeezed tightly against an obstruction extending across its path but, rather, immediately stops and reverses the window's closing movement to an opening movement by reversing the direction of rotation of the electric motor.

SUMMARY OF THE INVENTION

The object of the invention is achieved by an apparatus that comprises an elongated sensing mechanism that extends substantially across the width of a window aperture and along that side of the window aperture toward which a closing, motor driven window moves. Such elongated sensing mechanism is comprised, at least in part, of a piezoelectric cable for generating electrical pulses upon an obstruction extending across the path of the closing window being pushed against the sensing mechanism by the closing window. Coupled to the motor driven window is an electric motor that is connected so as to be responsive to the electrical pulses generated by the piezoelectric cable for automatically reversing the direction of rotation of the electric motor.

The piezoelectric cable employed by the present invention is of a type priorly known. It may be comprised of a metallic inner conductor, an insulation surrounding the same made of a specific material and an outer conductor being positioned above the insulation. The insulation is comprised of a polymer, for example a polyvinylidenfluoride, which has piezoelectric characteristics. Such a piezoelectric cable generates electric pulses during the application thereto of tension, compression or torsion forces, which pulses are sensed across the inner and outer conductors.

BRIEF DESCRIPTION OF THE DRAWINGS

A better understanding of the present invention as well as the objects and advantages thereof will become apparent upon consideration of the following detailed disclosure thereof, especially when taken with the accompanying drawing; wherein.

DETAILED DESCRIPTION OF A PREFERRED EMBODIMENT

Figure 1:
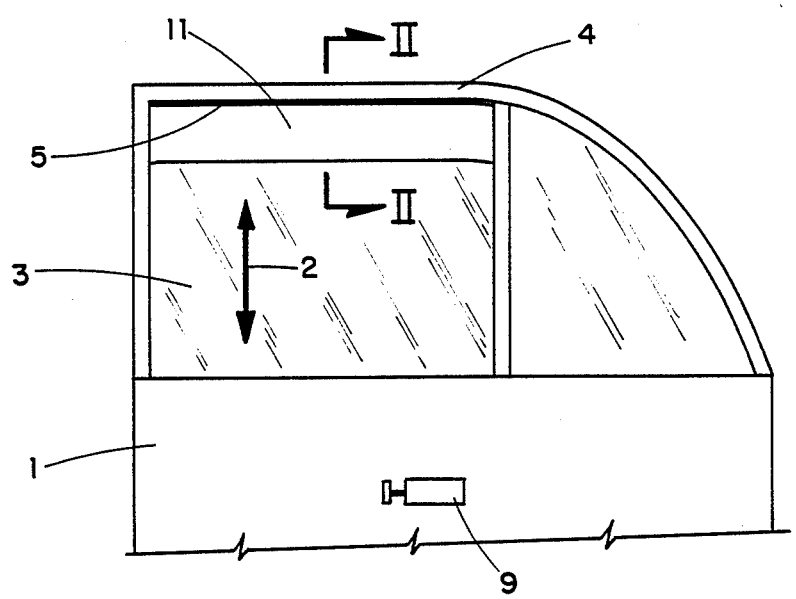
FIG. 1 is a diagrammatic representation of a safety apparatus installed in the door of an automotive vehicle for reversing the upward movement of a motor driven window upon the latter engaging an obstruction.
Figure 2:
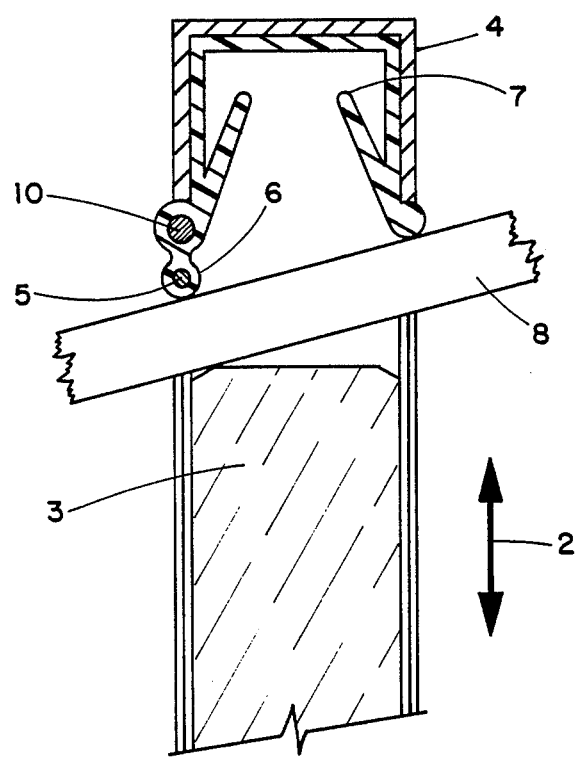
FIG. 2 is a partial, cross-sectional view of the vehicle door depicted in FIG. 1, taken along line II—II.

Referring to FIG. 1, there is depicted a vehicle door 1, having a window aperture 11 within which is slidably positioned a motor driven window 3 that is engaged in a conventional manner (not shown) by an electric motor 9 for adjusting the vertical height of the window. The vehicle door 1 includes an upper window frame 4 that defines the height limit of the motor driven window 3 when it is in its fully closed position. Positioned in the vicinity of the lower surface of the upper window frame 4 is an elongated sensing mechanism 5 extending substantially across the width of the window aperture 11. In the preferred embodiment depicted by FIG. 1, the elongated sensing mechanism 5 is comprised of piezoelectric cable of the aforesaid priorly known type that generates electric pulses upon being subjected to tension, torsion or compressive forces. As illustrated in FIG. 2, the elongated sensing mechanism 5 is extended through an elongated aperture of a flexible sealing lip 6 of a flexible seal mechanism 7 attached to the inner-lower surface of the upper window frame 4.

The operation of the preferred embodiment is as follows: If an obstruction 8 extends through the window aperture 11, between the upper window frame 4 and the top edge of the motor driven window 3, such obstruction will be pushed against a portion of the elongated sensing mechanism 5 (i.e., against the piezoelectric cable) when the window 3 is moved upwardly by the activation of the electric motor 9. The engagement of piezoelectric cable 5 by the obstruction 8 causes a stress condition in the piezoelectric cable 5 that causes generation of electrical pulses. The piezoelectric cable 5 is connected through an electronic amplification circuit (not shown) to the electric motor 9 for causing an immediate reversal of direction of rotation of the electric motor 9 upon the electrical pulses of the piezoelectric cable 5 surpassing a predetermined magnitude. Accordingly, the obstruction 8 is not subject to being clamped or squeezed tightly between the top edge of the motor driven window 3 and the upper window frame 4.

An alternative elongated sensing mechanism (not shown) may comprise a short length of piezoelectric cable in combination with two elongated members each attached to opposite ends of such cable and connected between two fixed points on opposite sides of the window aperture 11. In such alternative arrangement, the flexible seal mechanism 7 includes sufficient space to permit a significant flexing of such alternative elongated sensing mechanism upon the obstruction being pushed up against any part of such sensing mechanism. As illustrated in FIG. 2, such sufficient space is made available by an elongated aperture 10 extending through the flexible seal mechanism 7.

A further alternative elongated sensing mechanism (not shown) may comprise a single elongated member which extends through the sealing lip 6 in a condition of tension, and is connected at one of its ends to a length of piezoelectric cable also maintained in a condition of tension. In this alternative, the piezoelectric cable transmits electrical pulses upon a tension force being applied to one end of the cable upon the obstruction 8 being pushed against the single elongated member.

To avoid a reversal of the direction of rotation of the electric motor 9 upon a mere accidental touching of the elongated sensing mechanism 5, a conventional evaluation circuit (not shown) may be connected between such mechanism and such motor. Such evaluation circuit may advantageously include an impedance converter that amplifies the electronic pulses generated by the piezoelectric cable and a sector-alignment indicator by which the duration and magnitude of the force being exerted on the piezoelectric cable may be ascertained. Moreover, there may be provided a low pass filter for the suppression of erroneous pulses that may be generated by vibrations associated with the opening and closing of the vehicle door 1. Consequently, only when exceeding a predetermined value do the pulses generated by the piezoelectric cable cause a reversal of direction of rotation of the electric motor 9, and a reversal of the upward movement of the motor driven window 3.

While the invention has been described in connection with an exemplary embodiment thereof, it will be understood that many modifications will be apparent to those of ordinary skill in the art and that this application is intended to cover any adaptions or variations thereof. For example, though the invention has been described in the contexts of a motor driven window vertically positioned in the door of an automotive vehicle, it could be readily adapted to a motor driven window horizontally positioned within a window aperture in the roof of the automotive vehicle. Therefore, it is manifestly intended that the invention be only limited by the claims and equivalents thereof.

What is claimed:

1. Safety apparatus for a motor driven window of an automotive vehicle, comprising:

A vehicle outer wall including a window aperture;

a motor driven window slidably positioned within said outer wall and movable in a first direction toward a first side of said window aperture to assume a closed position, and movable in a second opposite direction to assume an open position;

a piezoelectric cable extending substantially across the width of said window aperture and along said first side of said window aperture for generating electrical pulses upon an obstruction extending through said window aperture being pushed against said piezoelectric cable; and an electric motor coupled to said motor driven window for movement in said first direction upon rotation of said electric motor in a first direction, and movement in said second opposite direction upon the reversal of direction of rotation of said electric motor, said electric motor being connected to said piezoelectric cable so as to be responsive to an electrical pulse generated thereby for reversing the direction of rotation of said electric motor upon said obstruction being pushed against said piezoelectric cable.

2. Safety apparatus in accordance with claim 1, wherein said piezoelectric cable is extending through an elongated aperture in a flexible seal attached to a surface of said vehicle outer wall in the vicinity of said first side of said window aperture.

* * * * *